(12) United States Patent
Gerhardt et al.

(10) Patent No.: US 7,967,365 B2
(45) Date of Patent: Jun. 28, 2011

(54) MOTOR VEHICLE STOWABLE ROOF ASSEMBLY

(75) Inventors: Torsten Gerhardt, London (GB); Alan Condon, Chelmsford (GB); John Harding, Southend (GB)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 12/443,911

(22) PCT Filed: Nov. 1, 2007

(86) PCT No.: PCT/GB2007/050669
§ 371 (c)(1),
(2), (4) Date: Apr. 1, 2009

(87) PCT Pub. No.: WO2008/056183
PCT Pub. Date: May 15, 2008

(65) Prior Publication Data
US 2010/0045077 A1  Feb. 25, 2010

(30) Foreign Application Priority Data
Nov. 7, 2006 (GB) .................. 0622172.5

(51) Int. Cl.
*B60J 7/00* (2006.01)
(52) U.S. Cl. ............... 296/107.03; 296/117; 280/756
(58) Field of Classification Search .......... 296/107.01, 296/116, 117, 121, 123, 107.03, 107.08, 296/107.13, 107.19, 107.2; 280/756
See application file for complete search history.

(56) References Cited

U.S. PATENT DOCUMENTS

| | | | |
|---|---|---|---|
| 2,548,105 A | 4/1951 | George | |
| 3,508,785 A | 4/1970 | Fu-Shueng Chang | |
| 5,056,857 A | 10/1991 | Ney et al. | |
| 6,296,278 B1 | 10/2001 | Zupancic et al. | |
| 7,156,446 B2 * | 1/2007 | Perakis | ............. 296/107.2 |
| 2004/0090092 A1 | 5/2004 | de Gaillard et al. | |

FOREIGN PATENT DOCUMENTS

| | | |
|---|---|---|
| DE | 40 2 6 120 A1 | 2/1991 |
| DE | 4026120 A1 | 2/1991 |
| DE | 199 26 474 A1 | 12/2000 |
| DE | 19926474 A1 | 12/2000 |

(Continued)

OTHER PUBLICATIONS

International Searching Authority, International Search Report and the Written Opinion of the International Searching Authority for the corresponding PCT Application PCT/GB2007/050669 mailed Feb. 18, 2008.

(Continued)

*Primary Examiner* — Joseph D Pape
(74) *Attorney, Agent, or Firm* — Gregory P. Brown; Brooks Kushman P.C.

(57) ABSTRACT

An actuation mechanism for a stowable front roof panel includes a first support assembly to provide vertical movement of the roof panel and a second sliding support structure to provide horizontal movement of the front roof panel. The first support assembly includes first and second upwardly extending supports and a transverse tubular cross member that in combination form an inverted U-shaped roll over protection member. The roll over protection member is used to provide roll over protection to the occupants of the motor vehicle in the event of a vehicle roll over.

10 Claims, 19 Drawing Sheets

FOREIGN PATENT DOCUMENTS

| | | |
|---|---|---|
| DE | 103 31 625 B3 | 1/2005 |
| DE | 10327015 A1 | 1/2005 |
| DE | 10331625 B3 | 1/2005 |
| EP | 0 275 184 A2 | 7/1988 |
| EP | 0275184 A2 | 7/1988 |
| JP | 59-048230 A | 3/1984 |
| JP | 59048230 | 3/1984 |
| JP | 60-244620 A | 12/1985 |
| JP | 60244620 | 12/1985 |
| JP | 62-198517 A | 9/1987 |
| JP | 62198517 A | 9/1987 |
| JP | 05058161 | 3/1993 |

OTHER PUBLICATIONS

The Patent Office Patent Directorate, Search Report for the corresponding GB Patent Application No. GB0622172.5 mailed Dec. 20, 2006.

German Patent & Trademark Office, Office Action for the corresponding German Patent Application No. 11 2007 002 620.0-24 mailed Nov. 6, 2010.

* cited by examiner

MOTOR VEHICLE STOWABLE ROOF ASSEMBLY

BACKGROUND OF INVENTION

This invention relates to a motor vehicle and in particular to a mechanism for stowing a roof panel of a motor vehicle.

It is known from, for example, European Patent publication 1564053 to provide a stowable roof assembly for a motor vehicle having a number of rigid panels that are moveable between in use and stowed positions.

It is a problem with vehicles having a stowable roof that the roll over protection afforded by such a roof construction is normally less than that provided by a fixed roof.

To mitigate this increase in risk to occupants of the motor vehicle it is further known from, for example, U.S. Pat. No. 3,508,785 and GB 2,425,093 to provide a deployable device that can provide protection to the occupants in the event of a vehicle roll over occurring.

It is an object of this invention to provide an actuation mechanism for a stowable roof panel that is of a simple but robust construction so as to provide improved roll over protection and that can be manufactured in a cost effective manner.

SUMMARY OF INVENTION

According to a first aspect of the invention there is provided a motor vehicle stowable roof assembly comprising a first support assembly to provide substantially vertical movement of a roof panel and a second sliding support assembly to provide substantially horizontal movement of the roof panel, the roof panel being moveable from an in use position to a stowed position by sliding the roof panel rearwards using the second support assembly from the in use position and lowering the roof panel using the first support assembly wherein the first support assembly includes an inverted U-shaped roll over protection member that forms part of a roll over protection system used to protect the occupants of the motor in the event of a vehicle roll over.

The actuation mechanism may be further operable to move the roof panel from the stowed position to its in use position by raising the roof panel from the stowed position using the first support assembly and sliding the roof panel forwards using the second support assembly.

The roof member may be moved from the in use position to a rear position by the second support assembly and is then lowered to the stowed position by the first support assembly.

The actuation mechanism may be further operable to move the roof panel from the stowed position to its in use position by raising the roof panel from the stowed position using the first support assembly and then sliding the roof panel forwards using the second support assembly.

The inverted U-shaped roll over protection member may comprise a first upwardly extending support, a second upwardly extending support and a transversely extending member connecting together respective upper ends of the first and second upwardly extending supports.

The first upwardly extending support may be slidingly connected to a substantially vertically arranged first guide rail fastened to part of the body structure of the motor vehicle and the second upwardly extending support may be slidingly connected to a substantially vertically arranged second guide rail fastened to part of the body structure of the motor vehicle to provide the vertical movement of the roof panel between its in use and stowed positions.

The roof panel may have first and second longitudinal edges and the first upwardly extending support may be connected at an upper end to the first longitudinal edge of the roof panel and the second upwardly extending support is connected at an upper end to the second longitudinal edge of the roof panel.

The roof panel may be a front roof panel.

The second sliding support assembly may comprises a first longitudinally extending rail fastened near to a first longitudinal edge of the roof panel slidingly cooperating with a first guide assembly fastened near to an upper end of the first upwardly extending support so as to provide a connection between the first upwardly extending support and the roof panel and a second longitudinally extending rail fastened near to a second longitudinal edge of the roof panel slidingly cooperating with a second guide assembly fastened near to an upper end of the second upwardly extending support so as to provide a connection between the second upwardly extending support and the roof panel.

The first guide assembly may include a first bracket fastened to the upper end of the first upwardly extending support and the second guide assembly includes a second bracket fastened to the upper end of the second upwardly extending support, wherein the first guide assembly further comprises two spaced apart rollers rotatably secured to the first bracket for cooperation with the first longitudinally extending rail and the second guide assembly further comprises two spaced apart rollers rotatably secured to the second bracket for cooperation with the second longitudinally extending rail.

The first longitudinally extending rail may have a toothed track formed along one edge for cooperation with a gearwheel rotatably supported by the first bracket and the second longitudinally extending rail has a toothed track formed along one edge for cooperation with a gearwheel rotatably supported by the second bracket, each gearwheel being driveably connected to a motor used to produce the substantially horizontal sliding movement of the roof panel.

The roll over protection system may further comprise a first roll over protection actuator fixed to a free end of the first upwardly extending support and a second roll over protection actuator fixed to a free end of the second upwardly extending support.

Each of the roll over protection actuators may have a base support member to transfer load from the respective upwardly extending support into the body structure of the motor vehicle and a force producing device to urge the base support members and the upwardly extending supports apart when roll over protection is required.

Each of the roll over protection actuators may have an inner support tube to directly transfer load from the respective upwardly extending support into the respective base support member when the actuator has been deployed.

The force producing device may be one of a pyrotechnic device and a spring device.

According to a second aspect of the invention there is provided a motor vehicle having an assembly constructed in accordance with said first aspect of the invention wherein the roll over protection system further comprises an electronic controller to determine when roll over protection is required based upon a signal received from one or more sensors.

When the roof panel is in its stowed position, the actuations of the first and second actuators by the electronic controller causes the U-shaped roll over protection member to be raised to provide roll over protection for the occupants of the motor vehicle.

When the roof panel is in its in use position, the actuations of the first and second actuators by the electronic controller may cause a base support member of each actuator to be moved into contact with a structural part of the motor vehicle so as to transfer load from the respective upwardly extending support forming part of the U-shaped roll over protection member to the structural part of the motor vehicle thereby providing roll over protection for the occupants of the motor vehicle.

The motor vehicle may comprise a passenger compartment including at least one row of seats and, when the roof panel is in the in use position, the roof panel is located above a respective row of seats and, when the roof panel is moved to the stowed position, the roof panel is located behind the respective row of seats.

The motor vehicle may have a front row of seats, a rear row of seats and a luggage compartment behind the rear row of seats and, when the roof panel is in the in use position, the roof panel is located above the front row of seats and, when the roof panel is moved to the stowed position, the roof panel is located behind the front row of seats so as to overlie the rear row of seats and the luggage compartment.

The roof panel may be a front roof panel and the motor vehicle further comprises a stowable rear roof panel that is stowed between the front and rear rows of seats so that, when the front roof panel is moved to the stowed position, the front roof panel is located behind the front row of seats so as to overlie the rear row of seats, the stowed rear roof panel and the luggage compartment.

BRIEF DESCRIPTION OF DRAWINGS

The invention will now be described by way of example with reference to the accompanying drawing of which.

DETAILED DESCRIPTION

Figure 1:
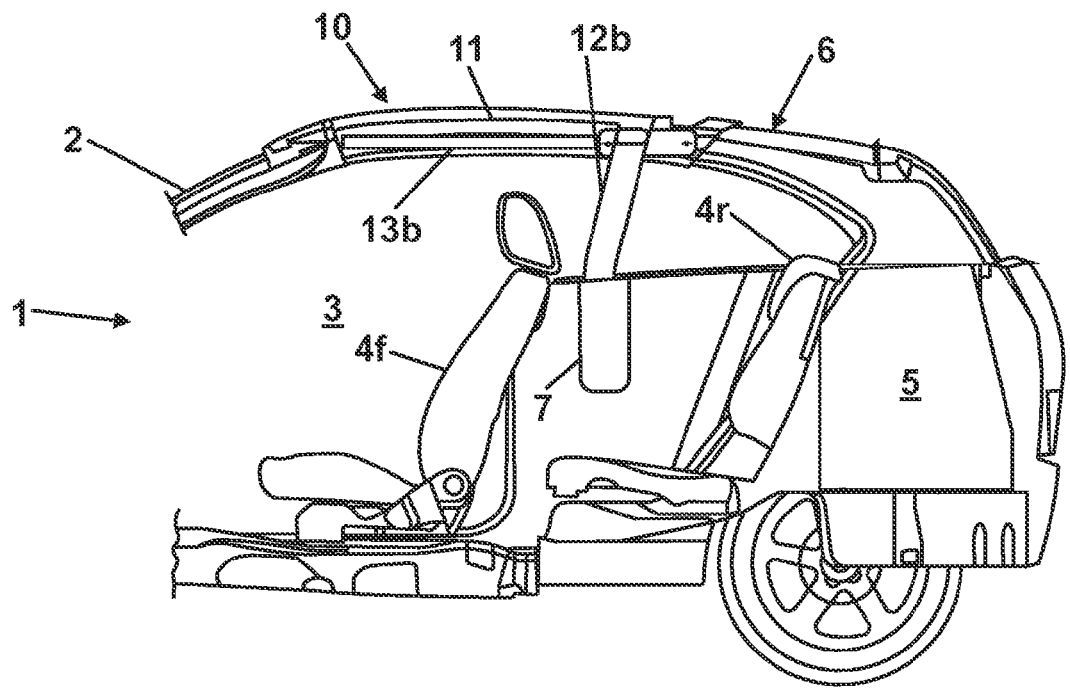
FIG. 1 is a scrap cross-section through a rear part of a motor vehicle having an actuation mechanism according to the invention, showing stowable front and rear panels in their respective in-use positions.
Figure 2:
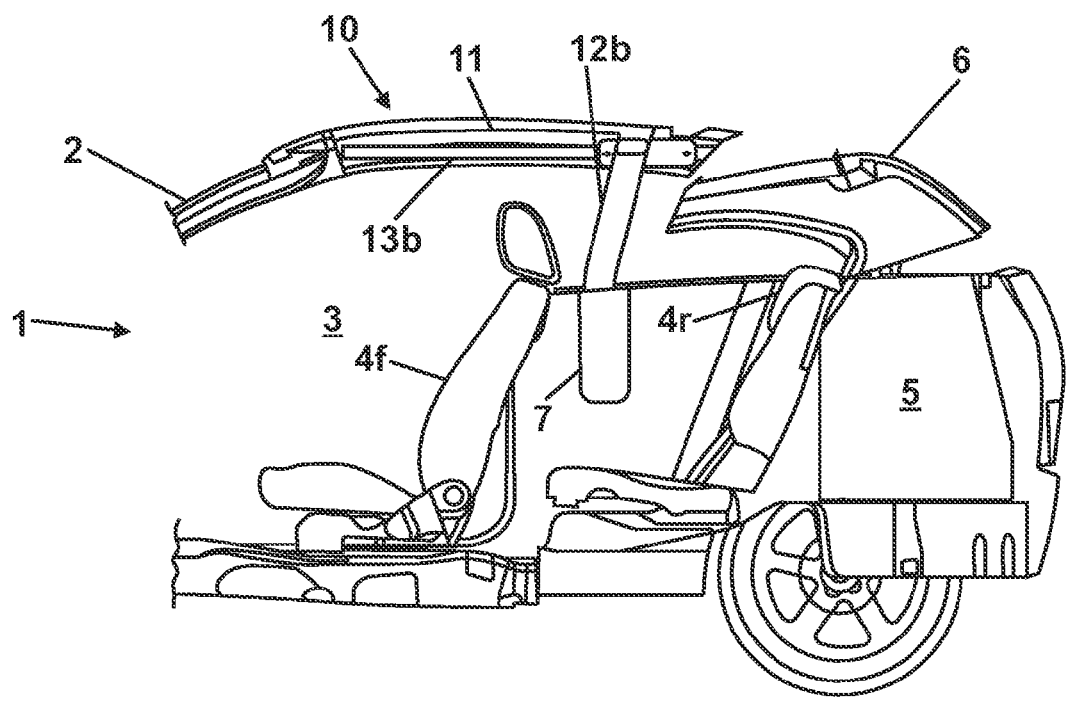
FIG. 2 to 12 are a cross-sections similar to that shown in FIG. 1 showing the front and rear roof panels in various stages of stowage.
Figure 3:
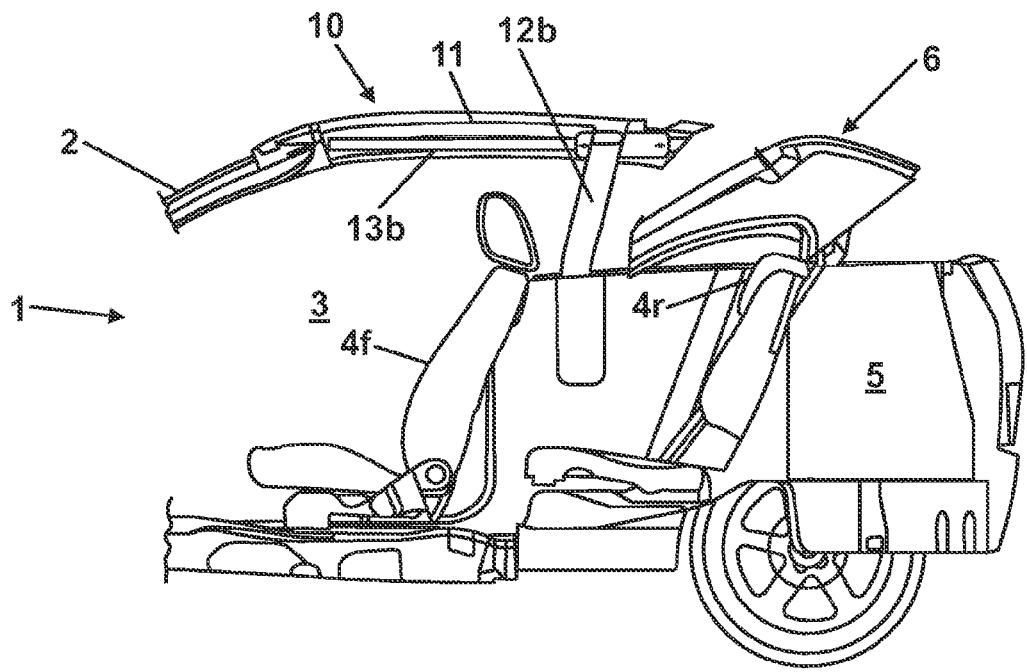

With reference to the figures there is shown a motor vehicle 1 having a body structure defining a passenger compartment 3 in which is mounted a front row of seats 4*f* and a rear row of seats 4*r*. A luggage compartment 5 is located behind the rear row of seats 4*r*.

The motor vehicle 1 has a two piece stowable roof assembly comprising of a front roof panel 11 and a rear roof panel 6 and is convertible from a four/five set hatchback type of vehicle into a two seat open top vehicle by stowing the front and rear roof panels 11 and 6.

The front roof panel 11 has a front edge extending transversely across the motor vehicle 1, a rear edge extending transversely across the motor vehicle 1, a first longitudinally extending edge extending in a fore aft direction along a left hand side of the motor vehicle 1 between the front and rear edges and a second longitudinally extending edge extending in a fore aft direction along a right hand side of the motor vehicle 1 between the front and rear edges.

When the front roof panel 11 and the rear roof panel 6 are both in their in use positions as shown in FIG. 1 the front edge of the front roof panel 11 sealingly abuts against a transverse portion of a windscreen surround 2 and the rear edge of the front roof panel 11 sealingly abuts with a front edge of the rear roof panel 6.

An actuation mechanism 10 is provided to move the front roof panel 11 between its in use an stowed positions.

The actuation mechanism 10 comprises of a first sliding support assembly to provide substantially vertical movement of the front roof panel 11 and a second sliding support assembly to provide substantially horizontal movement of the front roof panel 11. The front roof panel 11 being moveable from its in use position to its stowed position by sliding the front roof panel 11 rearwards using the second support assembly to a rear position and lowering the front roof panel 11 using the first support assembly to its stowed position. Although in the example provided the front roof panel 11 is moved fully rearwardly to its rear position before it is lowered, it will be appreciated that these operations could occur simultaneously in a phased manner.

The first sliding support assembly comprises a first or left hand side upwardly extending support 12*a* slidingly connected by means of a slider member 45 to a substantially vertically arranged first guide rail 16*a* fastened to part of the body structure of the motor vehicle 1 and a second or right hand side upwardly extending support 12*b* slidingly connected to a substantially vertically arranged second guide rail 16*b* fastened to part of the body structure of the motor vehicle 1.

The first upwardly extending support 12*a* is connected at an upper end to the first longitudinal edge of the front roof panel 11 and the second upwardly extending support 12b is connected at an upper end to the second longitudinal edge of the front roof panel 11.

An endless drive cable 17 is connected to the first and second upwardly extending supports 12a and 12b to raise and lower them relative to the body structure of the motor vehicle 1. A motor 18 is provided to move the endless drive cable 17. It will be appreciated that if required other means such as pneumatic or hydraulic rams could be used to raise and lower the first and second upwardly extending supports 12a and 12b and that the invention is not limited to the use of an endless cable drive.

The upper ends of the first and second upwardly extending supports 12a and 12b are connected together by a transversely extending member in the form of a tubular cross member 15. The first and second upwardly extending supports 12a and 12b and the tubular cross member 15 form in combination an inverted U-shaped roll over protection member or roll over bar that, when the front roof panel 11 is in its in use position, improves occupant safety in the event of a roll over of the vehicle 1. In addition, as described in detail with respect to FIGS. 21 to 25, this roll over protection member can also be deployed upwardly when the front roof panel 11 is in its stowed position by arranging for supplementary actuators 50a, 50b to be connected to the first and second upwardly extending supports 12a, and 12b, and, when a roll-over is sensed to be occurring, using the supplementary actuators 50a, 50b to urge the rollover bar upwards into a position where the tubular cross member 15 is positioned above a predicted upper head position of an occupant of the motor vehicle 1 so as to provide protection to the occupants of the motor vehicle 1.

It will be appreciated that the first and second upwardly extending supports 12a and 12b and the tubular cross member 15 can be made as three separate members that are joined together to form an inverted "U" or they could all be formed as parts of a single tubular member. It will also be appreciated that these components could be manufactured in a cost effective manner by an extrusion process.

Figure 19:
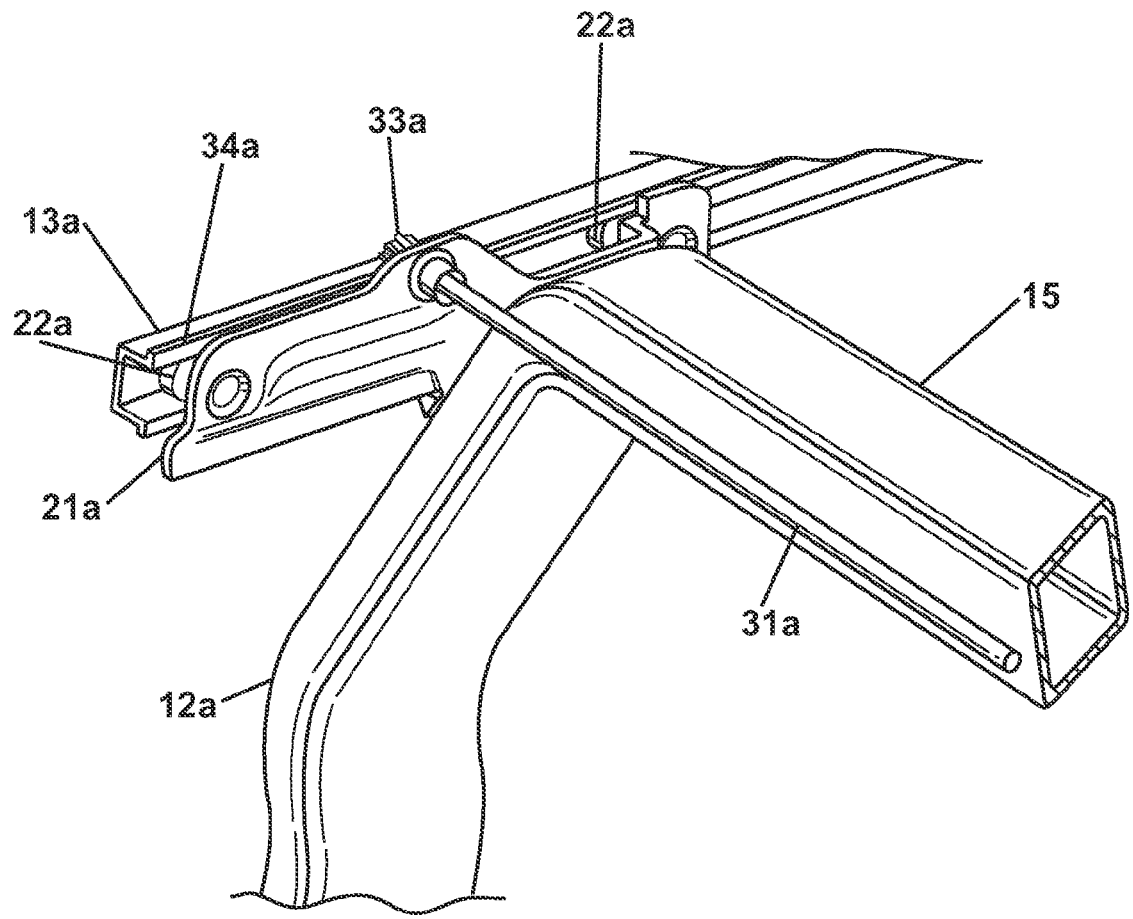
FIG. 19 is a pictorial view similar to that shown in FIG. 18 but showing part of the left hand side actuation mechanism.

The second sliding support assembly comprises a first longitudinally extending rail 13a (see FIG. 19) fastened near to the first longitudinal edge of the front roof panel 11 slidingly cooperating with a first guide assembly fastened to the upper end of the first upwardly extending support 12a so as to provide the connection between the first upwardly extending support 12a and the front roof member 11 and a second longitudinally extending rail 13b fastened near to the second longitudinal edge of the front roof panel 11 slidingly cooperating with a second guide assembly fastened to the upper end of the second upwardly extending support 12b so as to provide the connection between the second upwardly extending support 12b and the front roof member 11.

The first guide assembly includes a first bracket 21a fastened to the upper end of the first upwardly extending support 12a and two spaced apart rollers 22a rotatably secured to the first bracket 21a for cooperation with the first longitudinally extending rail 13a.

Figure 18:
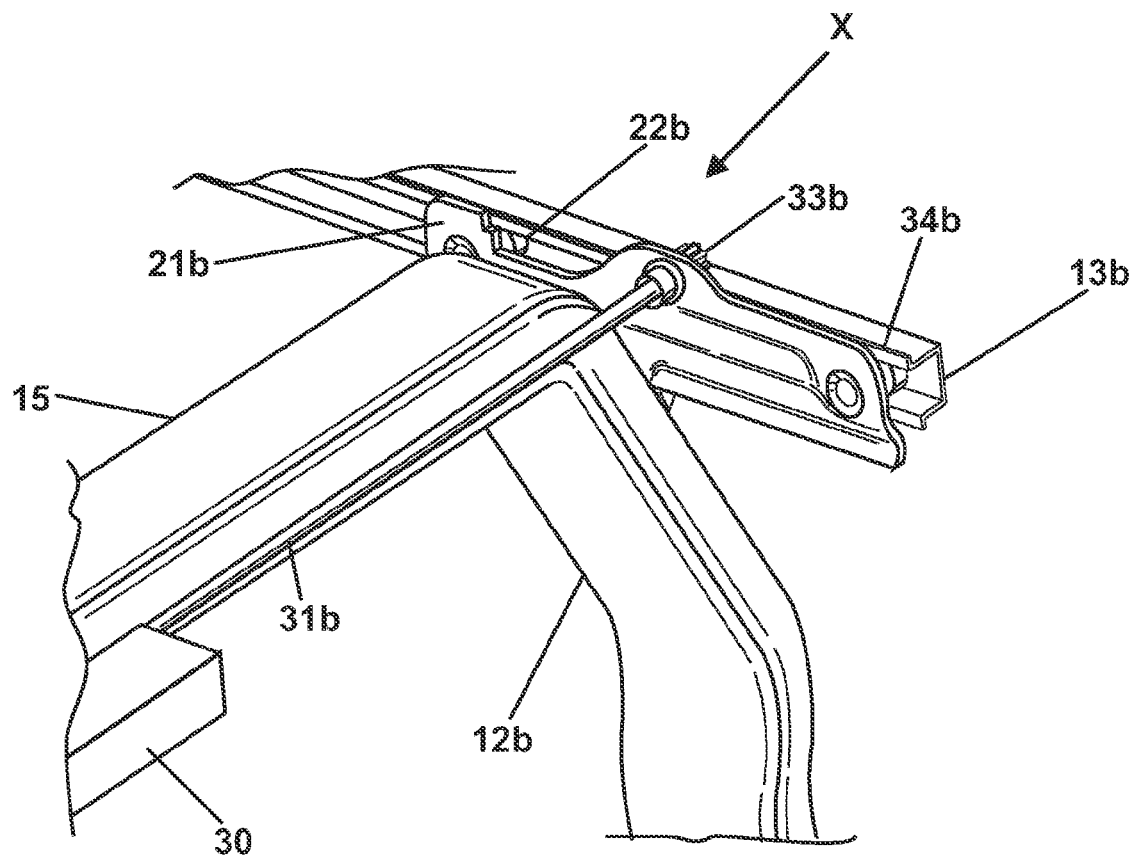
FIG. 18 is an enlarged rear pictorial view of part of the actuation mechanism shown in FIGS. 14 to 17.
Figure 20:
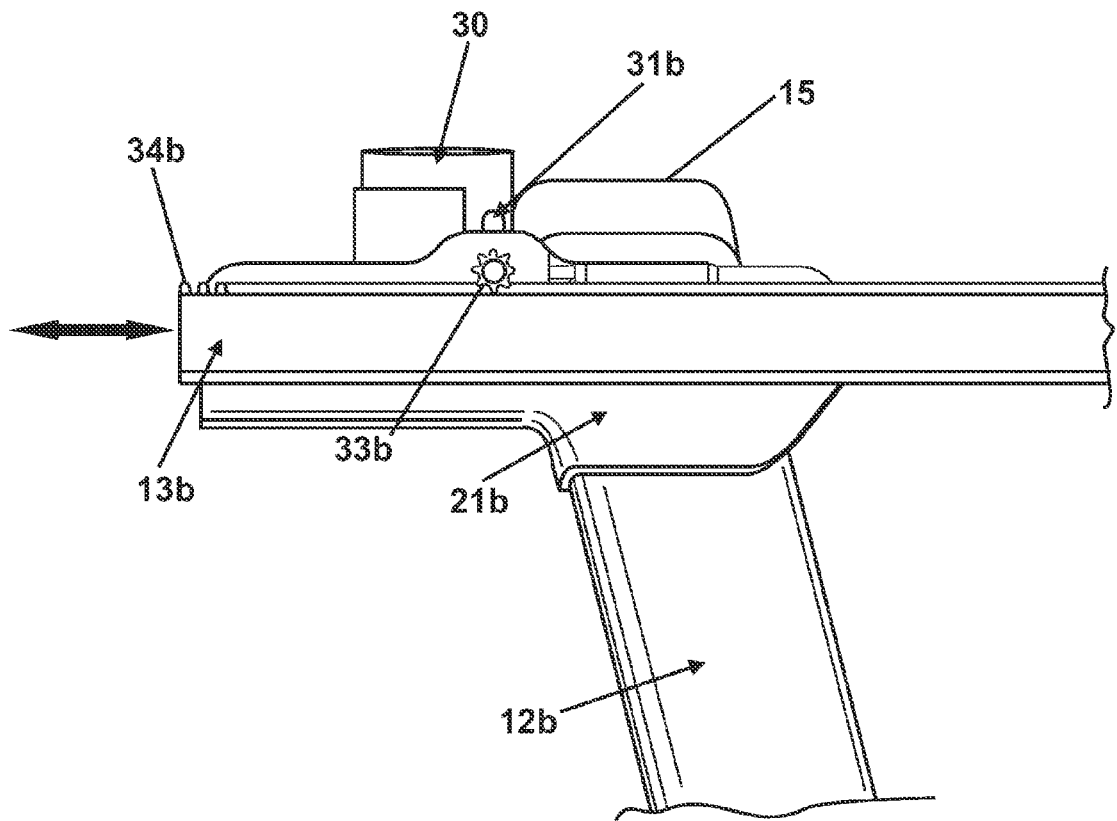
FIG. 20 is a view in the direction of arrow X on FIG. 18.

The second guide assembly, which is a mirror image of the first guide assembly and is shown in detail in FIGS. 18 and 20, includes a second bracket 21b fastened to the upper end of the second upwardly extending support 12b and two spaced apart rollers 22b rotatably secured to the second bracket 21b for cooperation with the second longitudinally extending rail 13b.

It will be appreciated that simple slide blocks could be used instead of rollers but the use of rollers is preferred because of the lower actuation force required to move the front roof panel 11.

Figure 15:
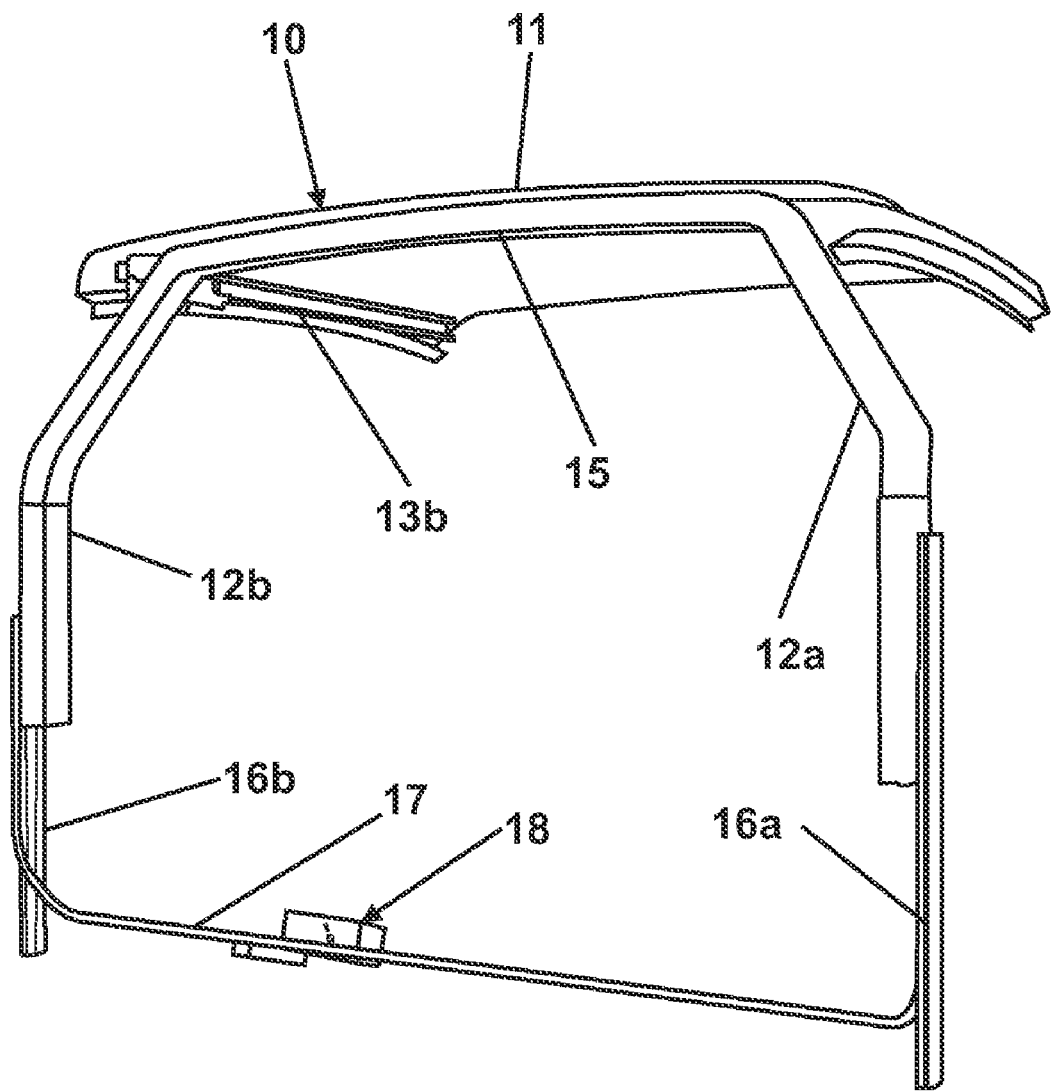
FIG. 15 is a pictorial view similar to that of FIG. 14 showing the actuation mechanism for the front roof panel with the front roof panel in a rear position during movement of the front roof panel between its in use and stowed positions corresponding to the front roof panel position shown in FIG. 9.
Figure 16:
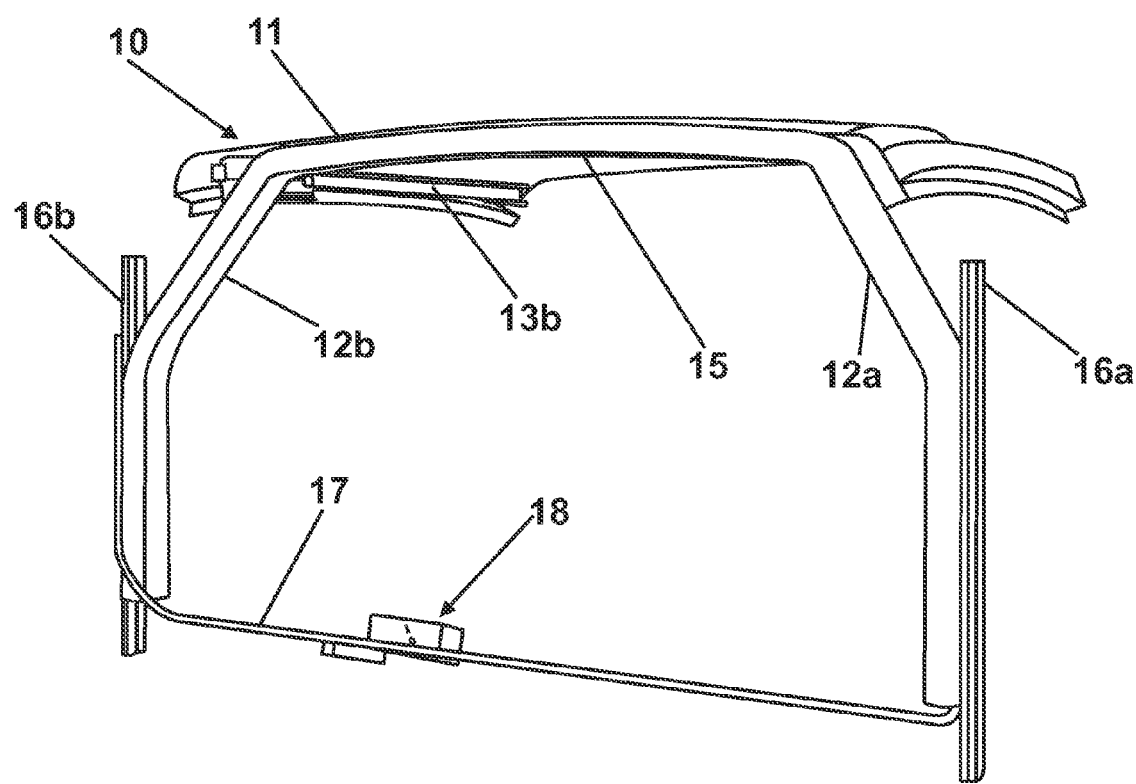
FIG. 16 is a pictorial view similar to that of FIG. 14 showing the actuation mechanism for the front roof panel with the front roof panel in a partially lowered position during movement of the front roof panel between its in use and stowed positions corresponding to the front roof panel position shown in FIG. 12.
Figure 17:
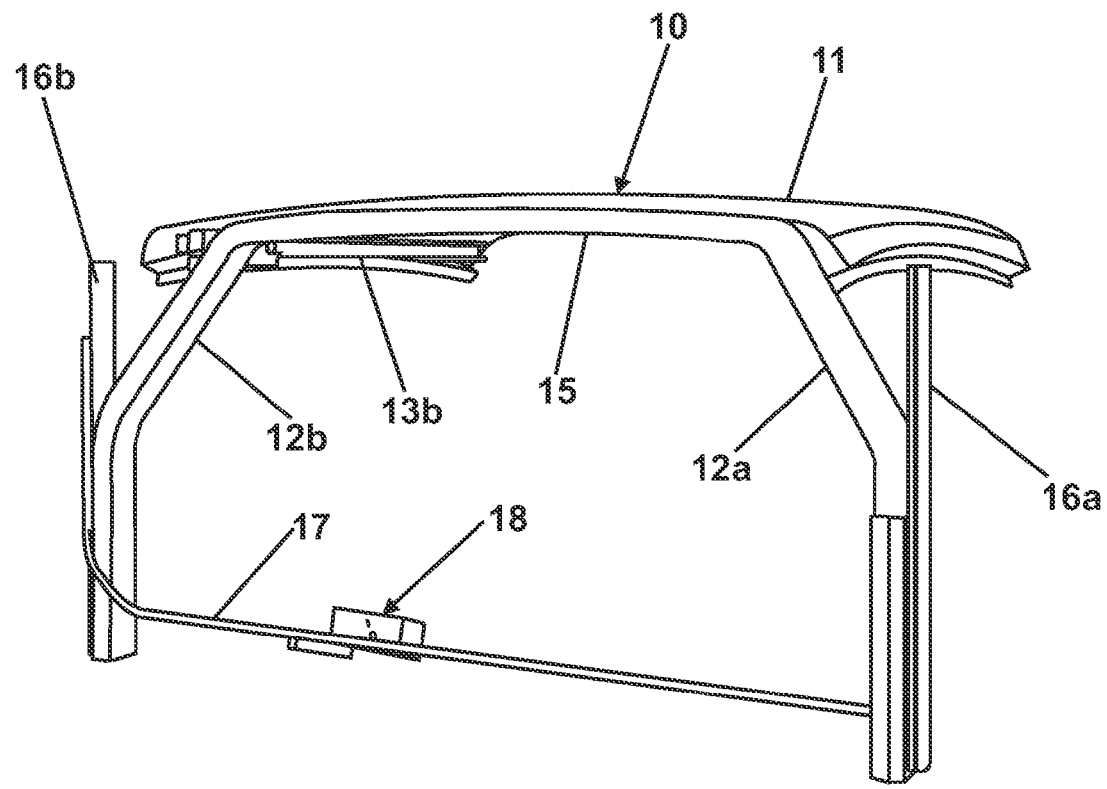
FIG. 17 is a pictorial view similar to that of FIG. 14 showing the actuation mechanism for the front roof panel with the front roof panel in its fully lowered or stowed position corresponding to the front roof panel position shown in FIG. 13.

The spacing between the rollers 22a, 22b must be sufficient to provide adequate support for the front roof panel 11 when it is moved between its in use and stowed positions to prevent angular rotation of the front roof panel 11. The load transmitted through the first and second guide assemblies is considerable when the front roof member 11 is in its rear position as shown in FIGS. 15 to 17 because then it takes the form of a cantilever and provides no counterbalancing effect and is not supported at either end by another structural part of the motor vehicle 1. It will be appreciated that when the front roof member 11 is in its in use position it also acts as a cantilever but in this position the front edge of the front roof panel 11 is supported by the windscreen surround 2 and the rear edge of the front roof panel 11 is supported by the rear roof member 6.

In one embodiment of the invention a centre distance between the rollers of 200 mm was found to provide sufficient stability for the front roof panel 11.

In order to provide a means of moving the front roof panel 11 in a horizontal direction, the first longitudinally extending rail 13a has a toothed track 34a formed along one edge for cooperation with a gearwheel 33a rotatably supported by the first bracket 21a and the second longitudinally extending rail 13b has a corresponding toothed track 34b formed along one edge for cooperation with a gearwheel 33b rotatably supported by the second bracket 21b.

The two gearwheels 33a, 33b are driveably connected to a motor 30 used to produce the substantially horizontal sliding movement of the front roof member 11 by respective shafts 31a, 31b. The two shafts 31a, 31b are connected to the motor 30 via a gearbox formed as one with the motor 30 so that the motion of the first and second guide rails 13a and 13b relative to their respective brackets 21a, 21b is synchronised and identical so as to prevent jamming of the front roof panel 11 as it is horizontally moved. The motor 30 is attached to the tubular cross-member 15.

It will be appreciated that other mechanisms could be used to horizontally move the front roof panel 11 and that the invention is not limited to the use of a gearwheel and toothed track arrangement.

Although the brackets 21a, 21b of the first and second guide assemblies are in the example shown connected directly to the upper ends of the first and second upwardly extending supports 12a, 12b it will be appreciated that they could be connected by some other means such as for example via the tubular cross member 15. It will also be appreciated that the first and second longitudinally extending rails 13a and 13b could be attached to an underside of the rear roof panel 11 at a small distance away from its longitudinal edges.

Operation of the actuation mechanism 10 is as follows starting from the in use positions of the front and rear roof panels 11 and 6 as shown in FIG. 1. When the front roof panel 11 is in its in use position it is located above the front row of seats 4f and the rear edge of the front roof member 11 is positioned above the rear row of seats 4r.

To stow the front and rear roof panels 11 and 6 the first operation is to commence with the stowing of the rear roof panel 6 during this initial period the actuation mechanism 10 for the front roof panel remains inoperative. A suitable mechanism such as that disclosed in UK Patent publication 2,420,530 or a four bar linkage can be used to effect this stowing of the rear roof panel 6.

Figure 4:
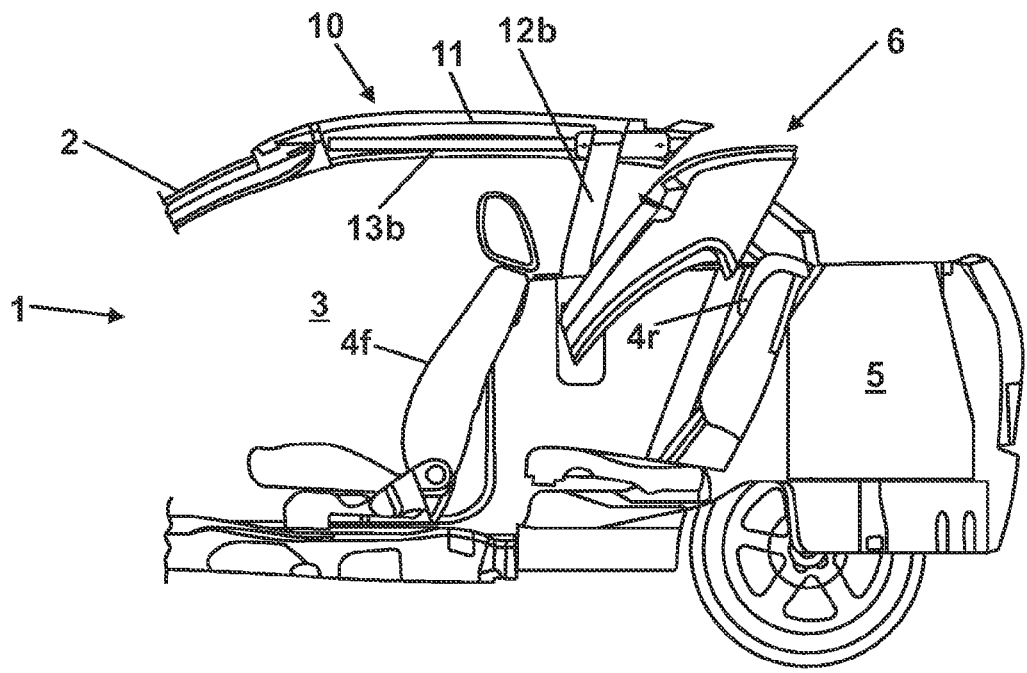
Figure 5:
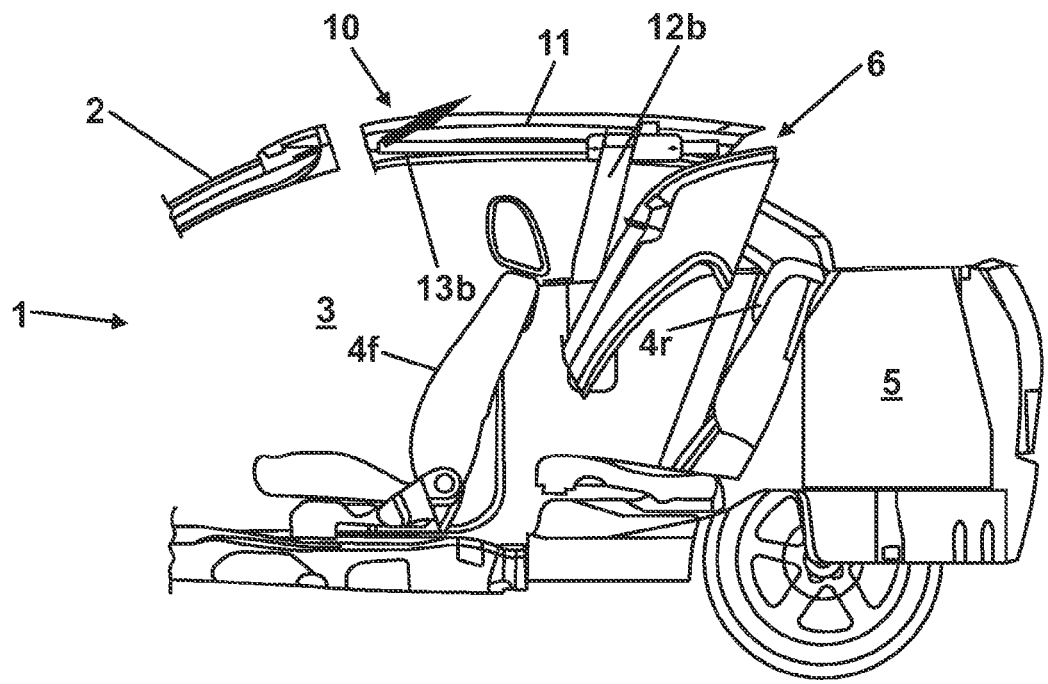

When the rear roof panel 6 has been partially stowed as shown in FIG. 4, the actuation mechanism 10 is activated by suitable sensor means to commence the stowing of the front roof panel 11. The motor 30 is actuated and the two gearwheels 33a, 33b begin to rotate causing the front roof panel 11 to begin to move rearwardly in a generally horizontal direction as shown in FIG. 5 due to their engagement with the toothed tracks 34a, 34b, on the first and second longitudinally extending guide rails 13a and 13b.

Figure 6:
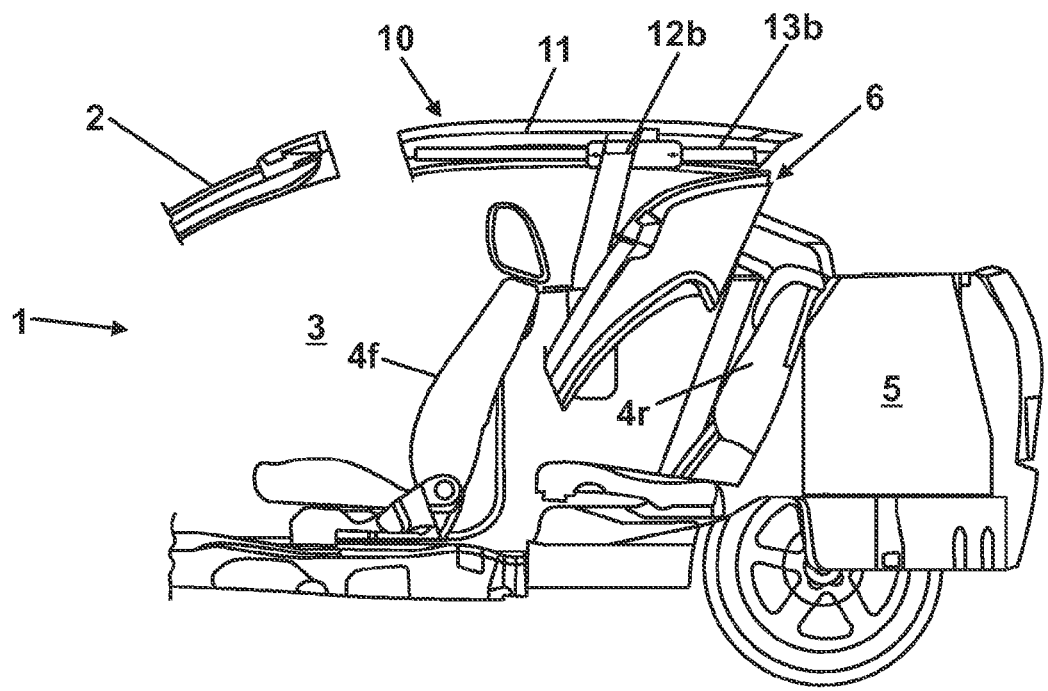
Figure 7:
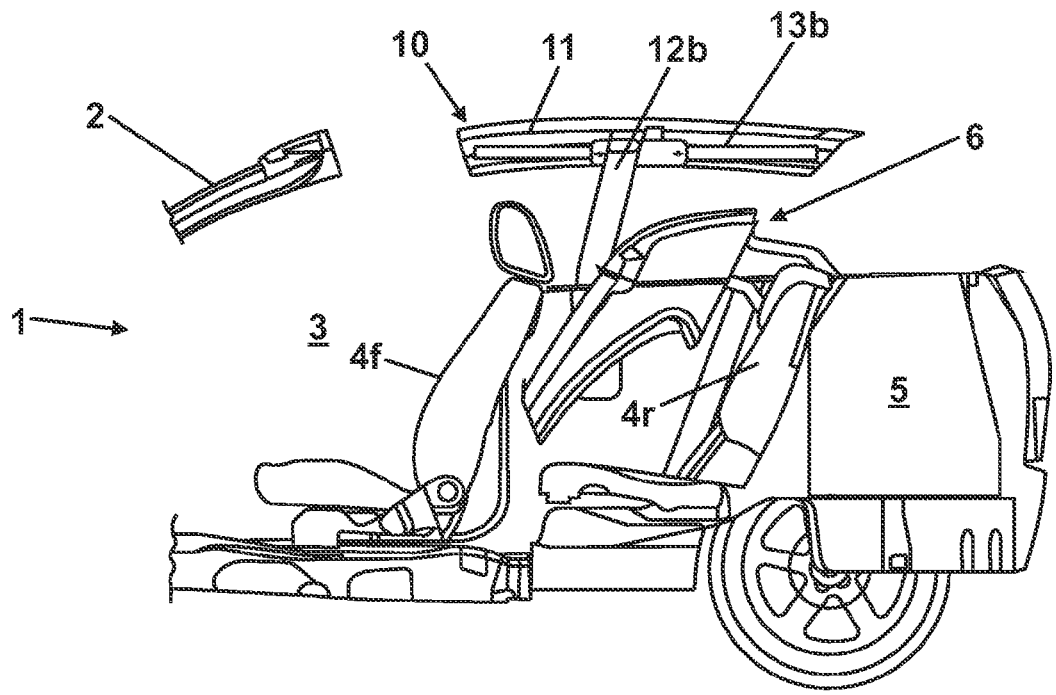
Figure 8:
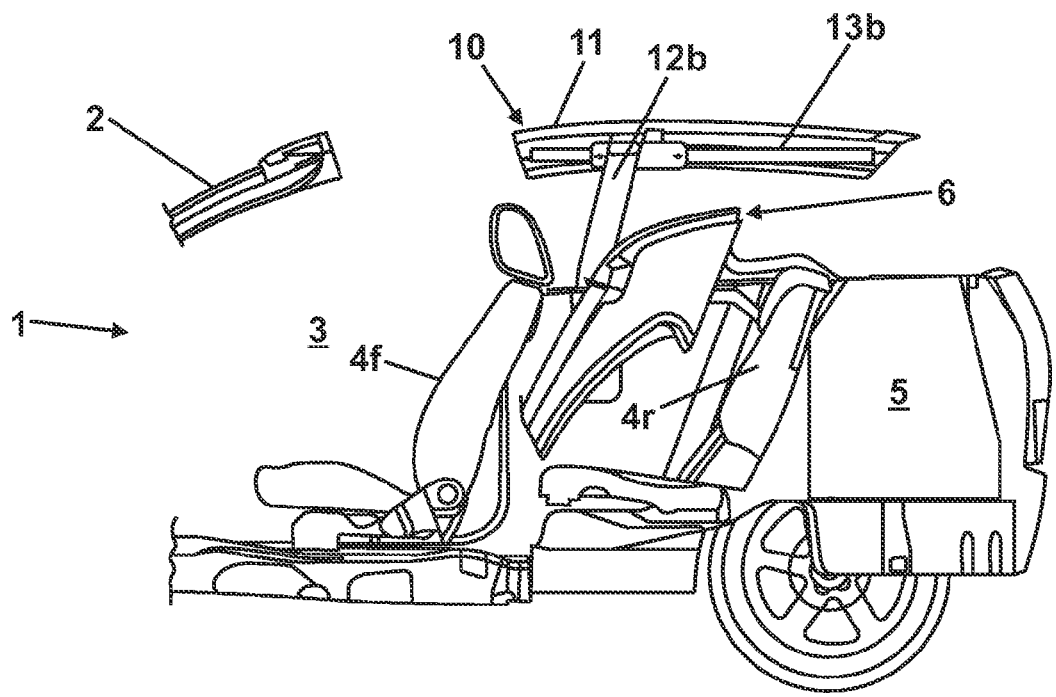
Figure 9:
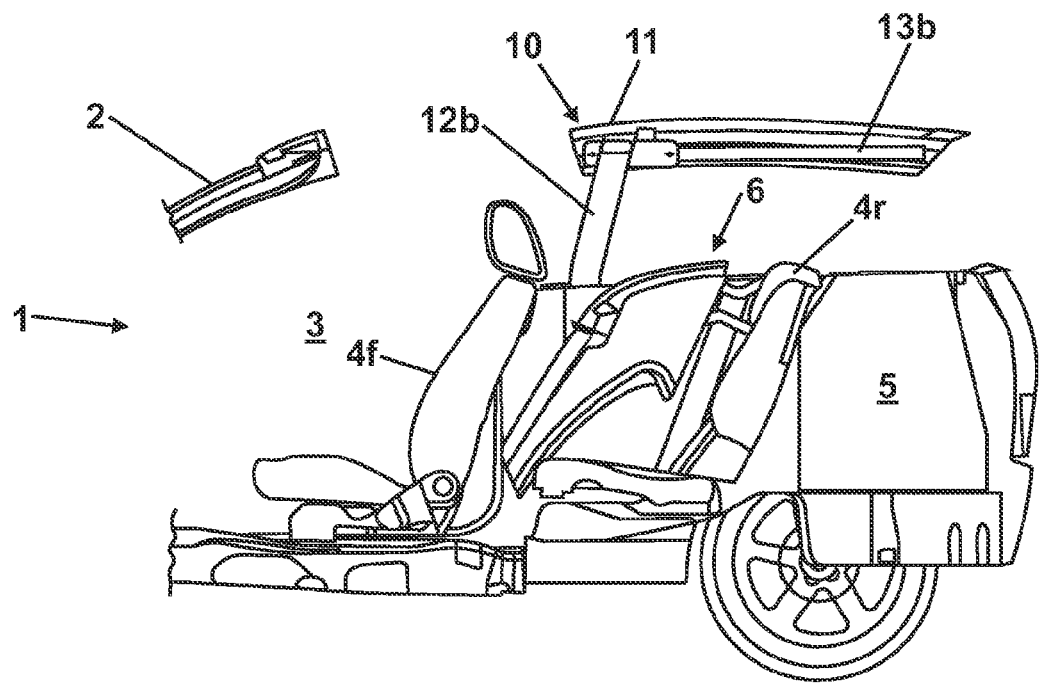

This rearward motion of the front roof panel 11 continues along with the stowing of the rear roof panel 6 as shown in FIGS. 6 to 8 until the front roof panel 11 reaches it rear position in which the front roller of each guide assembly has approached a front end of the longitudinally extending rail 13a, 13b with which it is engaged as shown in FIG. 9. A suitable sensor is used to determine when the rollers have reached this position and the signal from this sensor is also used to activate the motor 18 of the first sliding support assembly.

The front roof panel 11 remains in this rear position for the rest of the stowing process.

Figure 10:
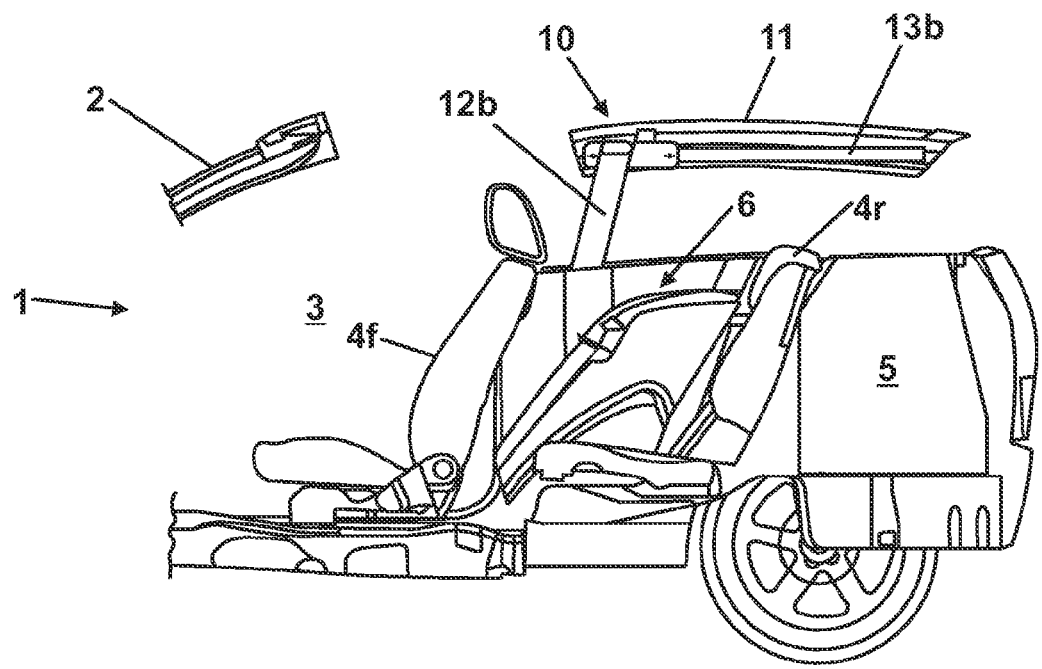

The front roof panel 11 is then lowered along with the continued stowing of the rear roof panel 6 as shown in FIG. 10 by energising the motor 18 which drives the endless drive cable 17 causing the first and second upwardly extending supports 12a, 12b to slide relative to the first and second guide rail 16a and 16b with which they are engaged.

Figure 11:
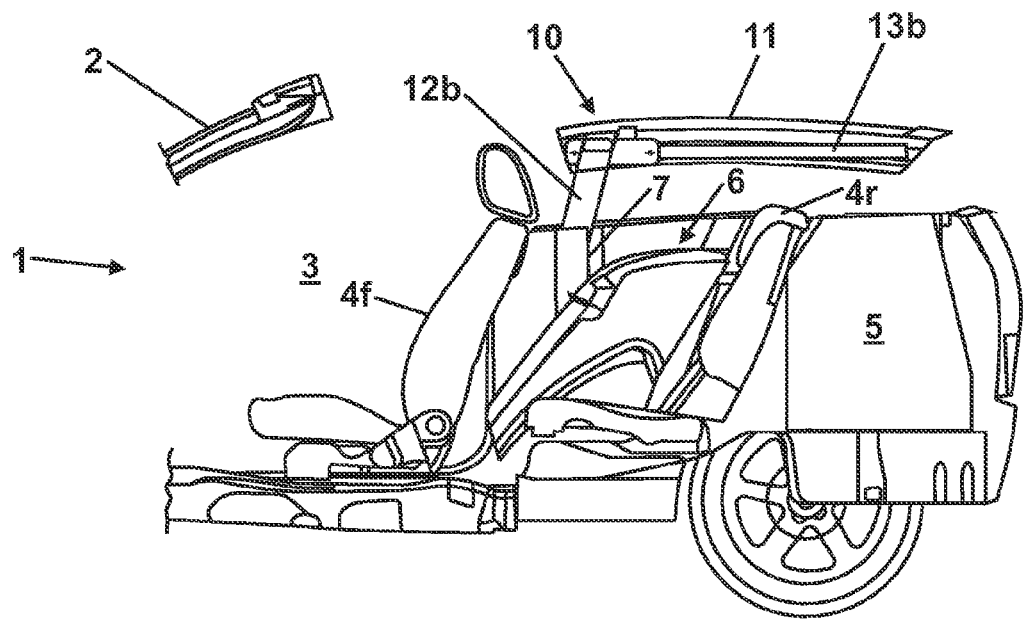
Figure 12:
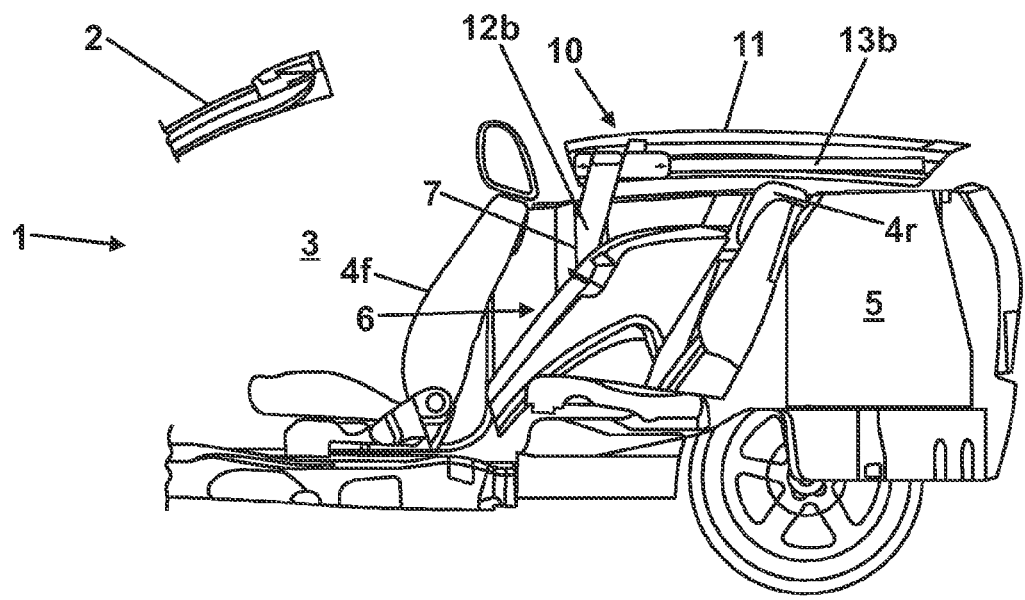
Figure 13:
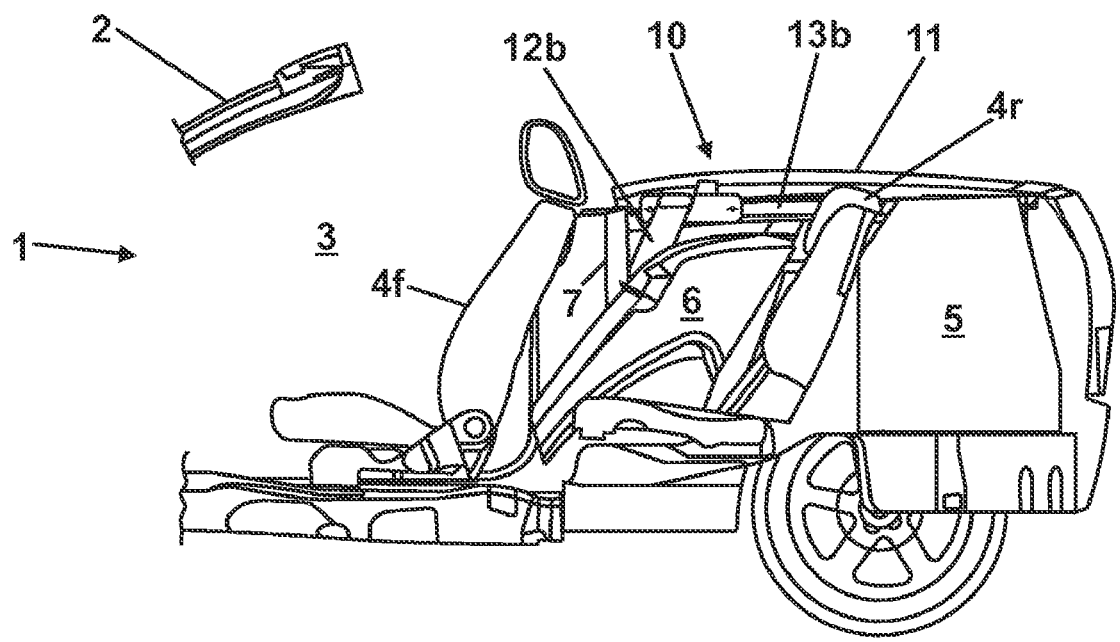
FIG. 13 is a cross-section similar to that shown in FIG. 1 showing the front and rear roof panels in their respective stowed positions.
Figure 14:
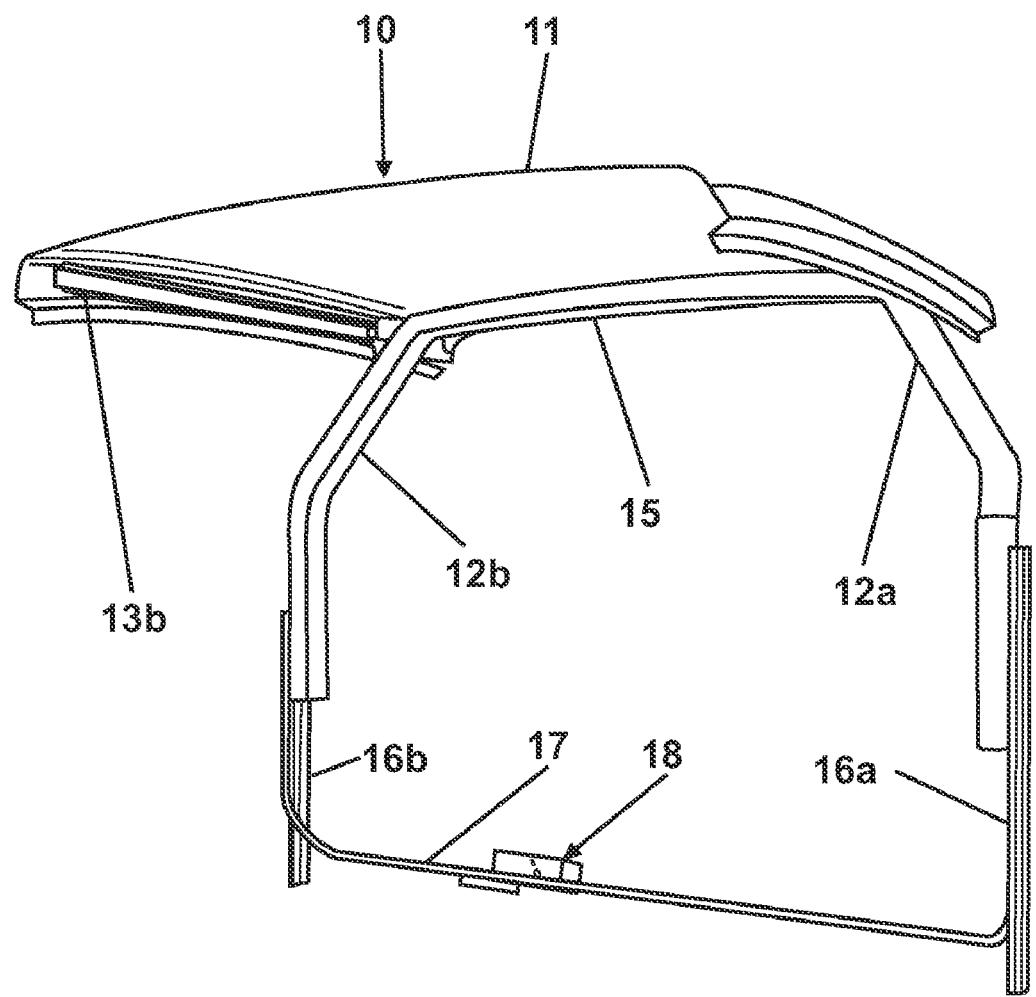
FIG. 14 is a pictorial view of the actuation mechanism for the front roof panel showing the front roof panel in its in use position corresponding to the front roof panel position shown in FIG. 1.

The downward motion of the front roof panel 11 continues after the rear roof panel 6 has reached its stowed position as shown in FIGS. 11 and 12 until the front roof panel 11 reaches its stowed position as shown in FIG. 13 at which point the motor 18 is switched off. During the final part of the stowage process flaps on each side of the motor vehicle 1, of which only the right hand flap 7 is shown, are opened by contact with the first and second upwardly extending supports 12a, 12b to permit the first and second upwardly extending supports 12a, 12b to be fully lowered.

In its stowed position the rear roof panel 6 is stowed between the front and rear rows of seats 4f and 4r so that, when the front roof panel 11 is in its stowed position, the front roof panel 11 is located behind the front row of seats 4f so as to overlie the rear row of seats 4r, the stowed rear roof panel 6 and the luggage compartment 5 for which it forms a cover.

It will be appreciated that to move the front roof panel 11 from its stowed position to its in use position the opposite procedure is followed that is to say the front roof member 11 is first moved vertically upwards by the first sliding support assembly and is then moved forwardly from its rear position to its in use position by the second sliding support assembly. During this motion the rear roof panel 6 will also be moved from its stowed position to its in use position in a synchronised and phased manner so that it does not interfere with the motion of the front roof panel 11.

With reference to FIGS. 21 to 25 there is shown a rollover protection system which is advantageously partially provided by the mechanism used to move the front roof panel 11.

Figure 25:
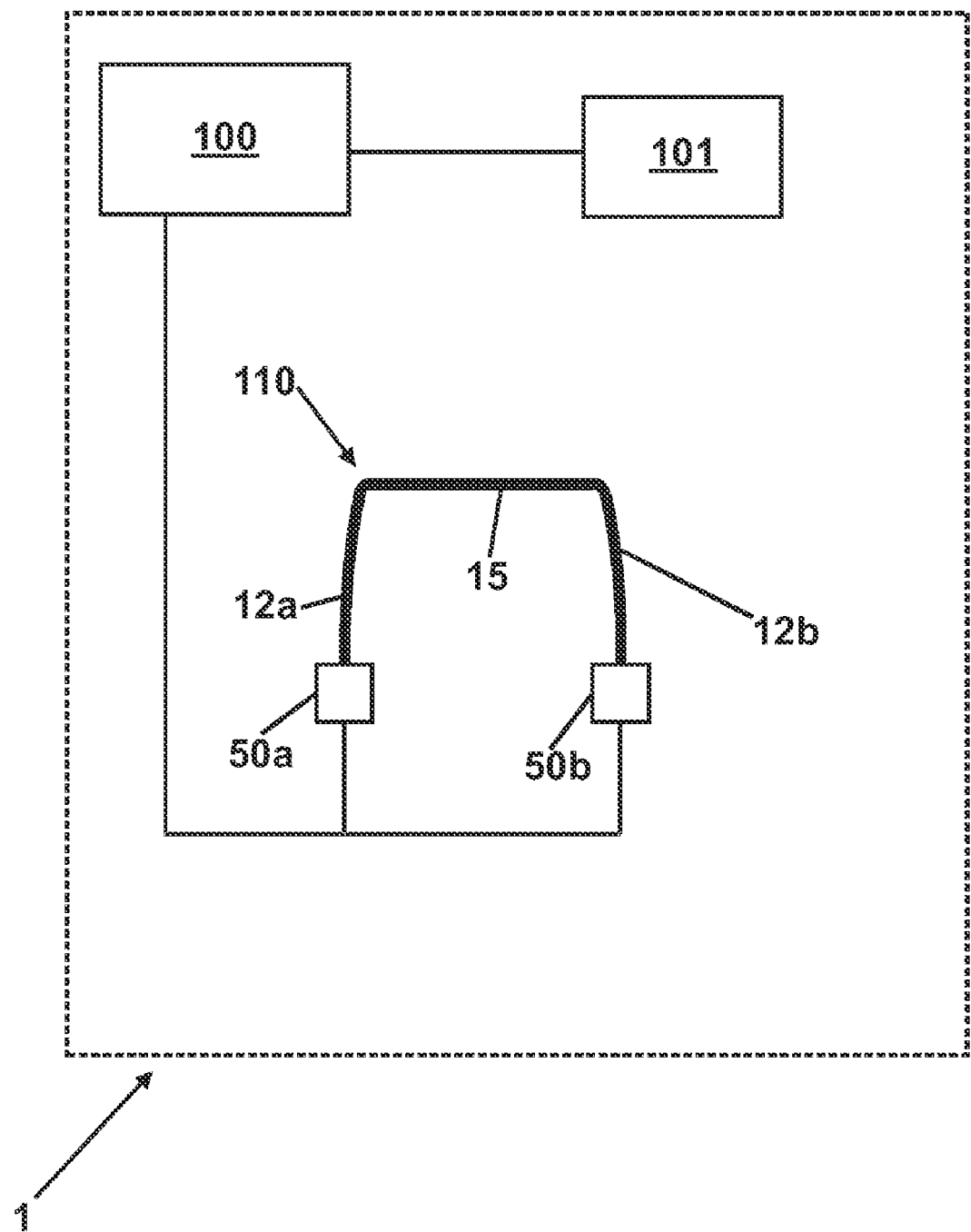
FIG. 25 is an outline diagram of a roll over protection system including a roll over protection member and two actuators of the type shown in FIGS. 21 to 24.

With reference to FIG. 25 the roll over protection system comprises of an electronic controller 100 arranged to receive one or more signals from at least one vehicle attitude sensor 101 used to determine whether the motor vehicle 1 is in the process of rolling over or is likely to roll over.

The electronic controller 100 can be a stand alone unit or can be formed as part of another electronic control unit such as, for example, a chassis controller. The electronic controller 100 is operatively connected to two roll over protection actuators 50a, 50b connected to the roll over protection member 110 formed by the first and second upwardly extending supports 12a and 12b and the tubular cross member 15. The first roll over protection actuator 50a is connected to the first upwardly extending support 12a and the second roll over protection actuator 50b is attached to the second upwardly extending support 12b.

The first and second roll over protection actuators 50a, 50b are identical in construction and have commonly numbered parts. Only the first roll over protection actuator 50a is shown and described in detail.

Figure 22:
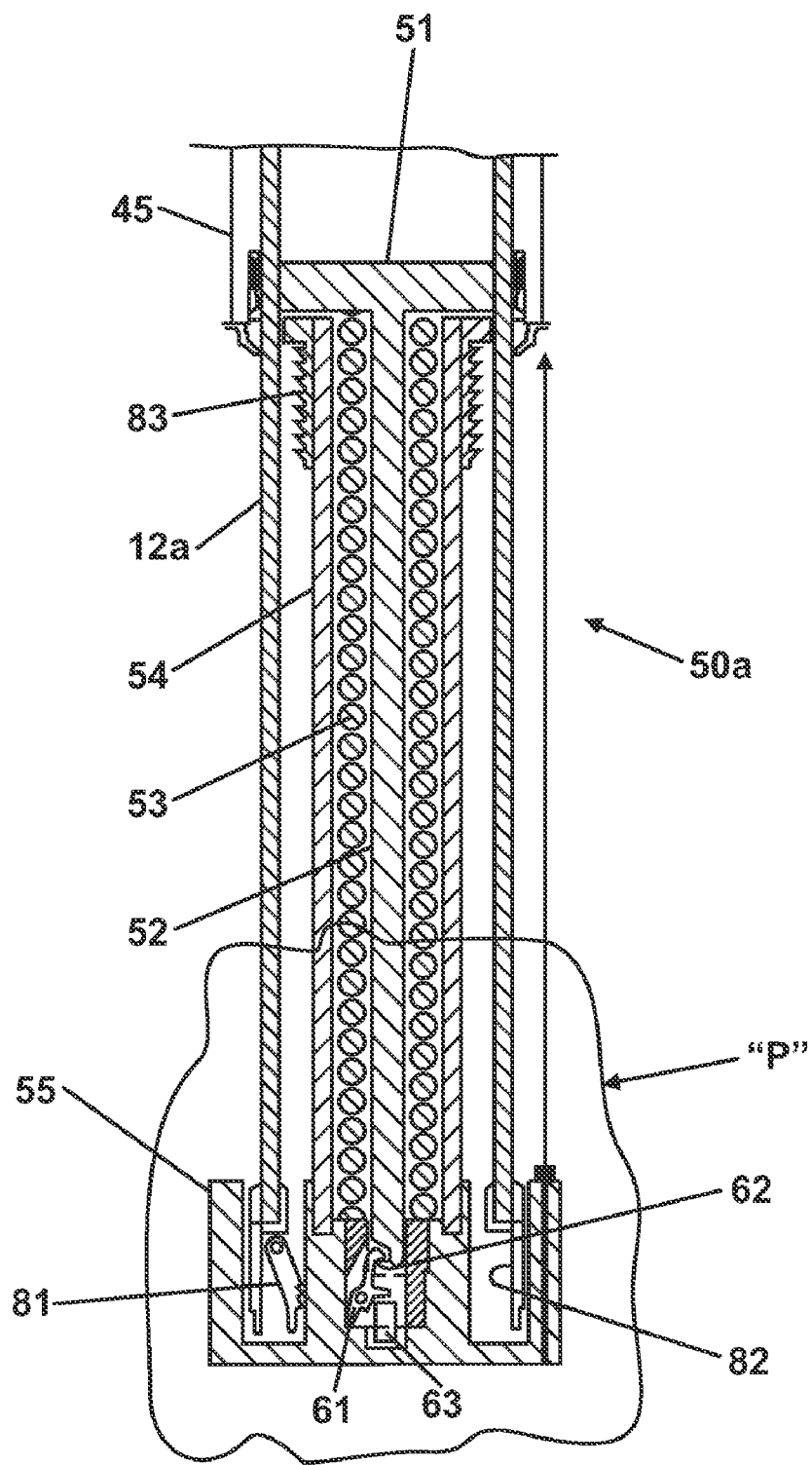
FIG. 22 is a cross-section through an actuator for the roll over protection member shown in FIG. 21 showing the actuator in a pre-deployment state.
Figure 23:
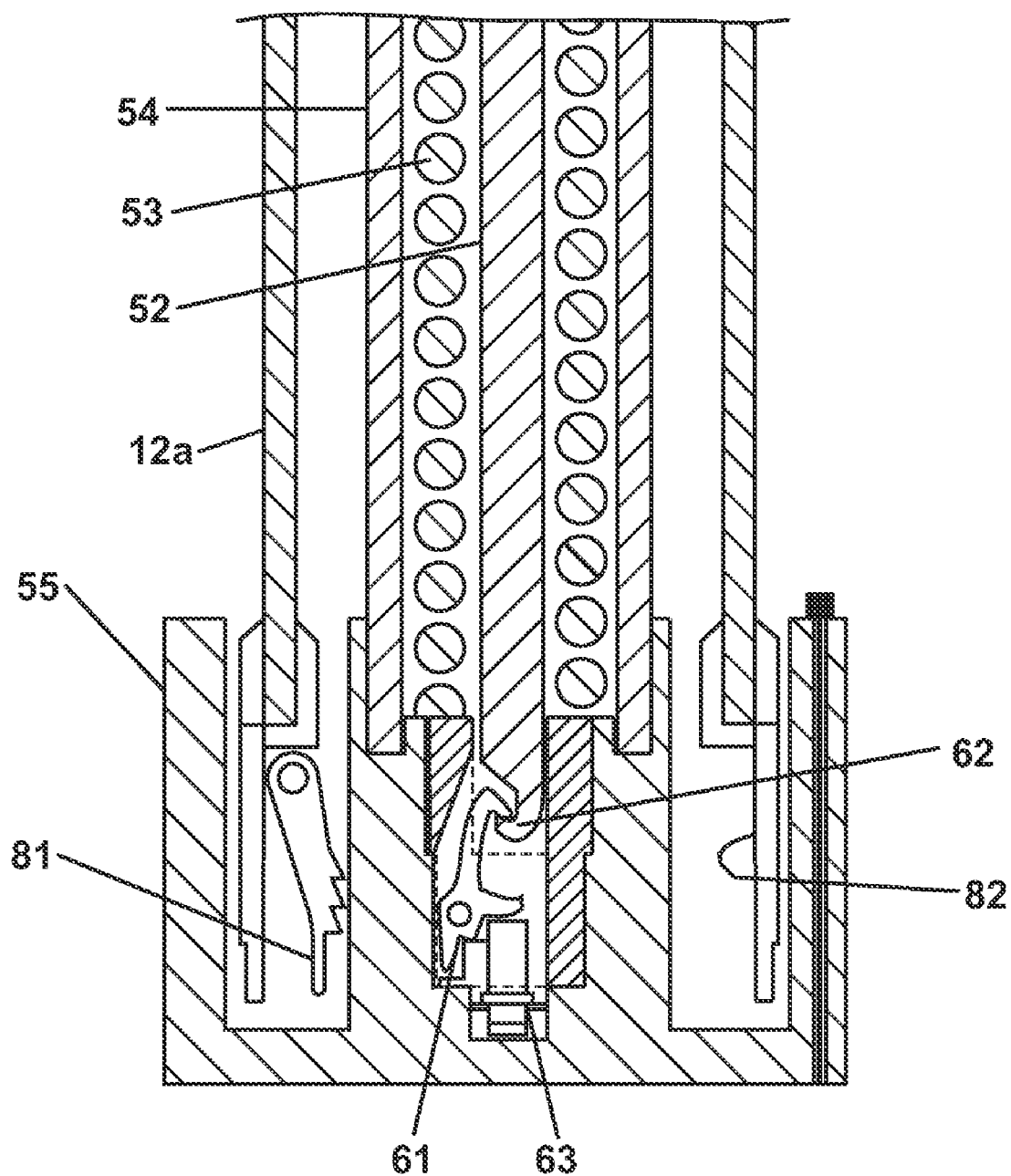
FIG. 23 is an enlarged view of the area depicted as "p" on FIG. 22.
Figure 24:
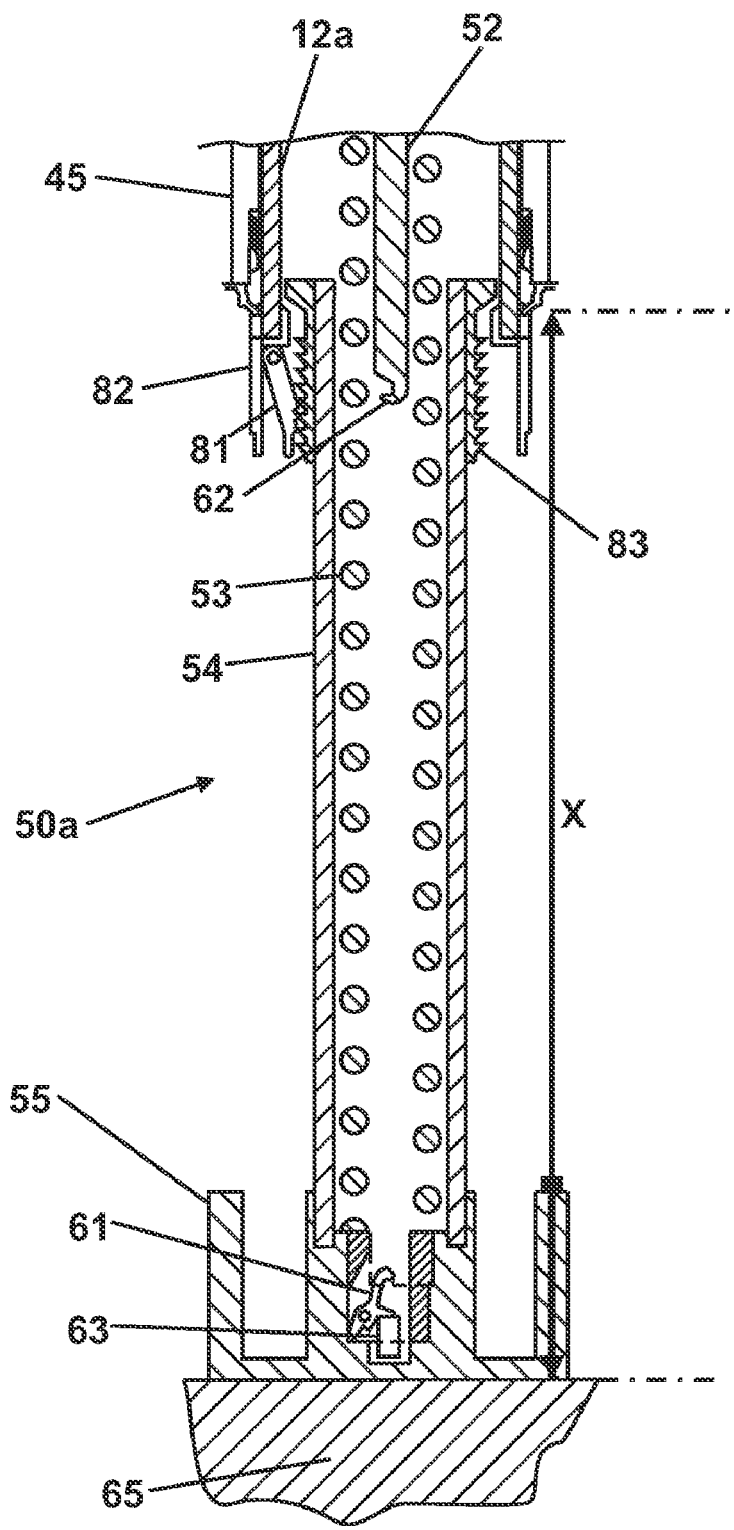
FIG. 24 is a view similar to FIG. 22 but showing the actuator member in a deployed state.

With reference to FIGS. 22 to 24 the first roll over protection actuator 50a comprises of a piston member having a head 51 fixed to the inside of the first upwardly extending support 12a so as to provide a driveable connection therebetween and an elongate piston rod 52 having a hooked end 62, an inner support tube 54 fastened at one end to a base support member 55, a helical compression spring 53 interposed between the piston head 51 and the base support member 55, a roll over protection latching mechanism to selectively hold the roll over protection actuator 50a in a pre-deployed state and a roll over deployed latch mechanism to hold the roll over protection actuator 50a in an extended state after deployment.

The roll over protection latching mechanism comprises of a rotary pawl 61 which is biased by spring into engagement with the hooked end 62 of the piston rod 52. An electronically operable release actuator 63 controlled by the electronic controller 100 is arranged to cooperate with the pawl 61 so as to selectively release the pawl 61 from its engagement with the hooked end 62 when the roll over protection member 110 is required to be deployed.

The roll over deployed latch mechanism comprises of a support ring 82 fastened to the end of the first upwardly extending support 12a, a serrated pawl 81 rotatably mounted on the support ring 82 and a serrated collar 83 fastened to a free end of the inner support tube 54. When the roll over protection latching mechanism is released the first upwardly extending support 12a and the base support member 55 are urged away from each other thereby allowing the serrated pawl 81 to engage with the serrated collar 83 to hold the roll over protection actuator 50a in an extended state. The serrated collar 83 also has a peripheral flange which acts as an end stop when the roll over protection actuator 50a is deployed. The flange interacts with the support ring 82 to prevent over travel of the roll over protection actuator 50a.

Operation of the roll over protection system is as follows.

When the front roof panel 11 is in its in use position the base support member 55 is displaced by a distance "X" (see FIG. 24) from a structural part 65 of the motor vehicle 1 that is reinforced to absorb load in the event of a roll over of the motor vehicle 1. When the signal or signals received from the vehicle attitude sensor 101 indicate that a roll over event is occurring or is predicted to occur the electronic control unit 100 is operable to deploy the actuators 50a, 50b by operating the release actuators 63. The energisation of the release actuators 63 causes the pawls 61 to be rotated out of engagement with the hooked ends 62 of the piston rods 52. The energy stored in the springs 53 is then released causing the base support members 55 to be to be urged downwardly away from respective upwardly extending supports 12a, 12b until the base support members 55 come into contact with the body structure 65.

The actuation of the first and second roll over protection actuators 50a, 50b by the electronic controller 100 therefore causes the base support members 55 of each actuator 50a, 50b to be moved into contact with a respective structural part 65 of the motor vehicle 1 so as to permit the transfer load from the U-shaped roll over protection member 110 directly into the structural part 65 of the motor vehicle 1 in the event of a roll over event.

When the front roof panel 11 is in its stowed position, each of the base support members 55 is already located against a respective structural part 65 of the motor vehicle 1. In this case, if the electronic control unit 100 determines from the vehicle attitude sensor 101 that a roll over event is occurring or is predicted to occur and energises the release actuators 63, the roll over protection member 110 will be raised to a position such that the tubular cross member 15 is positioned above the expected height of the head of an occupant of the motor vehicle 1.

As before energisation of the release actuators 63 causes the pawls 61 to be rotated out of engagement with the hooked ends 62 of the piston rods 52 allowing the energy stored in the springs 53 to be released. In this case, the release of the stored energy causes the respective upwardly extending supports 12a, 12b to be urged upwardly away from the base support member 55 and the base support members 55 react the forces from the springs 53 into the structural part 65 of the body structure upon which they are resting.

Figure 21:
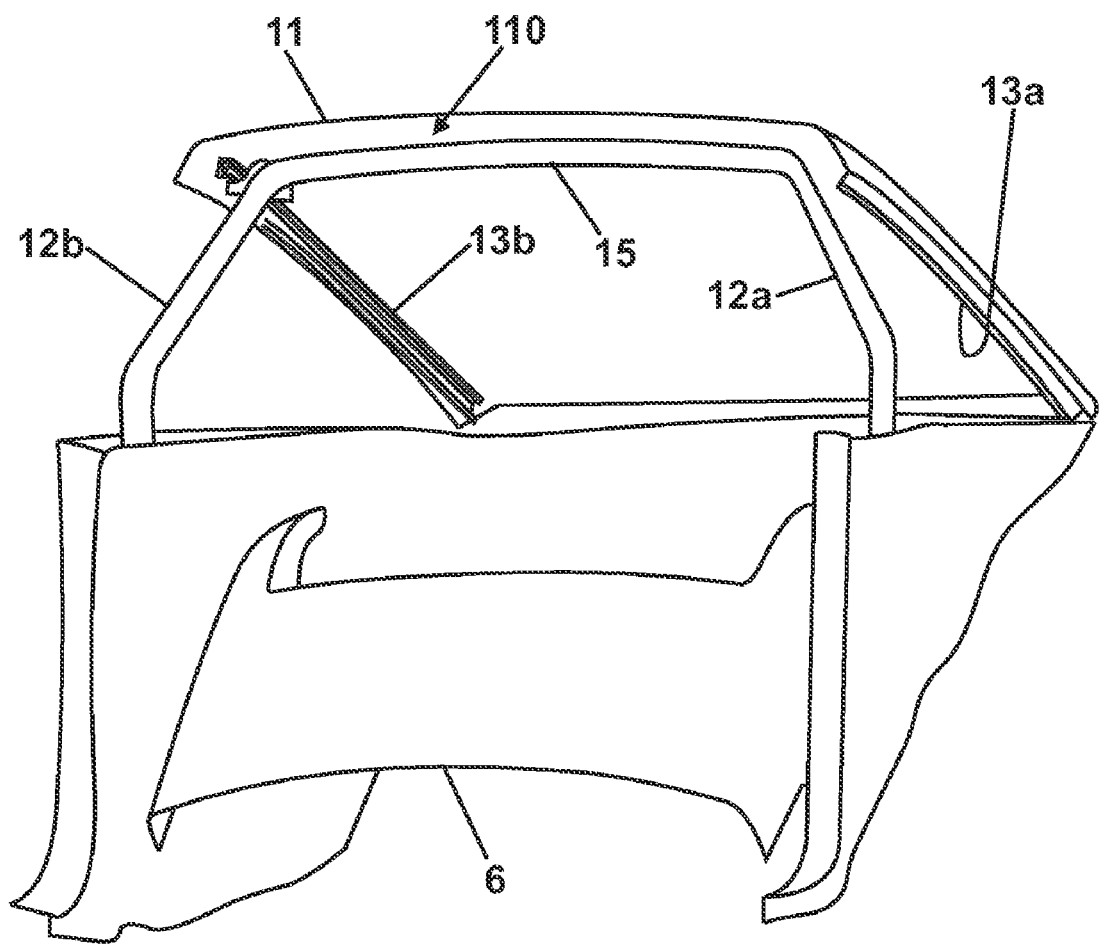
FIG. 21 is a pictorial view of a rear part of the motor vehicle showing a roll over protection member in a raised position.

The upwardly extending supports 12a, 12b continue to move upwardly until the respective support rings 82 engage with the flange on the serrated collars 83. This upward movement of the upwardly extending supports 12a, 12b causes the serrated pawls 81 to engage with the serrations on the serrated collars 83 thereby holding the roll over protection member 110 in the raised position so as to permit the forces of a roll over event to be directly transferred via the inner support tubes 54 into the structural part 65 of the body structure. As can be seen in FIG. 21 the upward movement of the roll over protection member 110 also causes the front roof panel 11 to be pivoted about a rear end.

Although the invention has been described by way of example with reference to an embodiment in which the roll over protection actuators include springs held in a compressed state, it will be appreciated that pyrotechnic devices or any other actuator capable of rapidly deploying the roll over protection member 110 could be used.

Although the invention has been described with reference to its use for moving a front roof panel of a motor vehicle it will be appreciated that the motor vehicle may have a stowable roof structure comprised of more than two roof panels in which case the mechanism could be used to stow an intermediate roof panel located in the in use position between a front roof panel and a rear roof panel.

One of the advantages of the invention is that it is very cost effective to manufacture because the first and second upwardly extending supports, the first and second guide rails, the tubular cross-member and the two longitudinally extending rails can all be manufactured as extrusions.

It will also be appreciated that the mechanism allows for a rollover protection system to be formed by the roof stowing mechanism thereby saving considerable cost.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention.

The invention claimed is:

1. A motor vehicle stowable roof assembly comprising a first support assembly to provide substantially vertical movement of a roof panel and a second sliding support assembly to provide substantially horizontal movement of the roof panel, the roof panel being moveable from an in use position to a stowed position by sliding the roof panel rearwards using the second support assembly from the in use position and lowering the roof panel using the first support assembly, the first support assembly including an inverted U-shaped roll over protection member that is selectively upwardly deployable when the roof panel is in the stowed position so as to protect the occupants of the motor vehicle in the event of a vehicle roll over, the roll over protection member comprising a first upwardly extending support slidingly connected to a substantially vertically arranged first guide rail fastened to part of the body structure of the motor vehicle, a second upwardly extending support slidingly connected to a substantially vertically arranged second guide rail fastened to part of the body structure of the motor vehicle and a transversely extending member connecting together respective upper ends of the first and second upwardly extending supports, the sliding connections between the upwardly extending supports and their respective guide rails providing the vertical movement of the roof panel between its in use and stowed positions, the assembly further comprising a first roll over protection actuator fixed to a free end of the first upwardly extending support and a second roll over protection actuator fixed to a free end of the second upwardly extending support, each of the roll over protection actuators having an inner support tube to directly transfer load from the respective upwardly extending support into a vehicle body structure when the actuator is deployed.

2. An assembly as claimed in claim 1 wherein the second sliding support assembly comprises a first longitudinally extending rail fastened near to a first longitudinal edge of the roof panel slidingly cooperating with a first guide assembly fastened near to an upper end of the first upwardly extending support so as to provide a connection between the first upwardly extending support and the roof panel and a second longitudinally extending rail fastened near to a second longitudinal edge of the roof panel slidingly cooperating with a second guide assembly fastened near to an upper end of the second upwardly extending support so as to provide a connection between the second upwardly extending support and the roof panel.

3. An assembly as claimed in claim 2 in which the first guide assembly includes a first bracket fastened to the upper end of the first upwardly extending support and the second guide assembly includes a second bracket fastened to the upper end of the second upwardly extending support, wherein the first guide assembly further comprises two spaced apart rollers rotatably secured to the first bracket for cooperation with the first longitudinally extending rail and the second guide assembly further comprises two spaced apart rollers rotatably secured to the second bracket for cooperation with the second longitudinally extending rail.

4. An assembly as claimed in claim 1 wherein each of the roll over protection actuators comprises a force producing device to urge the upwardly extending supports away from the body structure when roll over protection is required.

5. An assembly as claimed in claim 1 further comprising an electronic controller to determine when roll over protection is required based upon a signal received from one or more sensors and actuate the roll over protection actuators.

6. An assembly as claimed in claim 5 wherein, when the roof panel is in its stowed position, the actuations of the first and second actuators by the electronic controller causes the U-shaped roll over protection member to be raised to provide protection for the occupants of the motor vehicle.

7. A stowable roof assembly for a motor vehicle comprising:
- a roof panel moveable relative to a body structure of the motor vehicle between an in use position and a stowed position;
- a first support assembly operatively connected with the roof panel to provide substantially vertical movement of the roof panel between the in use and stowed positions, the first support assembly comprising a roll over protection member that is selectively upwardly deployable when the roof panel is in the stowed position, the roll over protection member comprising first and second upwardly extending supports slidingly connected to respective first and second guide rails attachable to the body structure of the motor vehicle, and a transversely extending member connecting respective upper ends of the first and second upwardly extending supports;
- at least one roll over protection actuator operable to upwardly deploy the roll over protection member, the at least one roll over protection actuator fixed to a free end of at least one of the upwardly extending supports, the roll over protection actuator having an inner support tube to directly transfer load from the upwardly extending support into a vehicle body structure when the actuator is deployed; and
- a second sliding support assembly operatively connected with the roof panel and the first support assembly to provide substantially horizontal movement of the roof panel between the in use and stowed positions.

8. An assembly as claimed in claim 7 wherein the roll over protection actuator comprises a force producing device to urge the upwardly extending support away from the body structure when roll over protection is required.

9. An assembly as claimed in claim 8 wherein the force producing devices is a spring.

10. An assembly as claimed in claim 4 wherein at least one of the force producing devices is a spring.

* * * * *